(12) United States Patent
Kumiya (10) Patent No.: US 9,079,310 B2
(45) Date of Patent: Jul. 14, 2015

(54) APPARATUS AND METHOD OF TAKING OUT BULK STORED ARTICLES BY ROBOT

(71) Applicant: FANUC Corporation, Minamitsuru-gun, Yamanashi (JP)

(72) Inventor: Hidetoshi Kumiya, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 24 days.

(21) Appl. No.: 13/949,523

(22) Filed: Jul. 24, 2013

(65) Prior Publication Data
US 2014/0031985 A1    Jan. 30, 2014

(30) Foreign Application Priority Data

Jul. 26, 2012 (JP) .................... 2012-165553

(51) Int. Cl.
*G05B 15/00* (2006.01)
*B25J 9/16* (2006.01)

(52) U.S. Cl.
CPC ..... *B25J 9/1697* (2013.01); *G05B 2219/37567* (2013.01); *G05B 2219/39476* (2013.01); *G05B 2219/40053* (2013.01)

(58) Field of Classification Search
USPC ............ 700/245, 249, 253, 259; 901/8, 9, 14, 901/31, 47
See application file for complete search history.

(56) References Cited

U.S. PATENT DOCUMENTS

| | | | |
|---|---|---|---|
| 4,305,130 A * | 12/1981 | Kelley et al. ................. | 700/259 |
| 4,402,053 A * | 8/1983 | Kelley et al. ................. | 700/259 |
| 4,985,846 A * | 1/1991 | Fallon ........................... | 382/153 |
| 6,898,484 B2 * | 5/2005 | Lemelson et al. ............. | 700/245 |
| 7,123,992 B2 * | 10/2006 | Ban et al. ...................... | 700/258 |
| 7,177,459 B1 * | 2/2007 | Watanabe et al. ............. | 382/151 |
| 7,474,939 B2 * | 1/2009 | Oda et al. ...................... | 700/245 |
| 7,590,468 B2 * | 9/2009 | Watanabe et al. ............. | 700/259 |
| 7,657,346 B2 * | 2/2010 | Ban et al. ...................... | 700/262 |
| 7,957,580 B2 * | 6/2011 | Ban et al. ...................... | 382/153 |
| 7,957,583 B2 * | 6/2011 | Boca et al. .................... | 382/154 |
| 8,095,237 B2 * | 1/2012 | Habibi et al. ................. | 700/245 |
| 8,295,975 B2 * | 10/2012 | Arimatsu et al. ............. | 700/216 |
| 8,355,816 B2 * | 1/2013 | Saito ............................. | 700/253 |

(Continued)

FOREIGN PATENT DOCUMENTS

| | | |
|---|---|---|
| CN | 101396829 A | 4/2009 |
| CN | 101772402 A | 7/2010 |

(Continued)

*Primary Examiner* — Khoi Tran
*Assistant Examiner* — Jorge Peche
(74) *Attorney, Agent, or Firm* — Drinker Biddle & Reath LLP (57) ABSTRACT

An article take-out apparatus comprising: a robot having a hand capable of holding an article; a 3D measuring device measuring surface positions of a plurality of articles stored in bulk in a 3D space to acquire a 3D point set composed of a plurality of 3D points; a local maximum point selecting unit selecting from the 3D point set a 3D point, where a coordinate value with respect to a predetermined coordinate axis is maximum; a processing unit determining a hand position and posture including a target position and target posture of the hand enabling an article near the local maximum point to be taken out based on the selected local maximum point; and a robot control unit controlling the robot so as to move the hand to the determined hand position and posture and take out the article from the hand position and posture.

6 Claims, 10 Drawing Sheets

(56) References Cited

U.S. PATENT DOCUMENTS

| | | | |
|---|---|---|---|
| 8,447,097 B2* | 5/2013 | Fujieda et al. | 382/154 |
| 8,472,698 B2* | 6/2013 | Agrawal et al. | 382/153 |
| 2006/0181236 A1* | 8/2006 | Brogardh | 318/568.1 |
| 2007/0213874 A1* | 9/2007 | Oumi et al. | 700/245 |
| 2007/0238981 A1* | 10/2007 | Zhu et al. | 600/424 |
| 2007/0274812 A1* | 11/2007 | Ban et al. | 414/217 |
| 2007/0282485 A1* | 12/2007 | Nagatsuka et al. | 700/245 |
| 2010/0004778 A1* | 1/2010 | Arimatsu et al. | 700/214 |
| 2010/0017178 A1* | 1/2010 | Tsuk et al. | 703/6 |
| 2010/0274390 A1* | 10/2010 | Walser et al. | 700/259 |
| 2011/0010009 A1* | 1/2011 | Saito | 700/253 |
| 2011/0123122 A1* | 5/2011 | Agrawal et al. | 382/203 |
| 2011/0301744 A1* | 12/2011 | Ichimaru | 700/214 |
| 2012/0059517 A1* | 3/2012 | Nomura | 700/259 |
| 2012/0072021 A1* | 3/2012 | Walser et al. | 700/254 |
| 2012/0158180 A1* | 6/2012 | Iio et al. | 700/259 |

FOREIGN PATENT DOCUMENTS

| | | |
|---|---|---|
| JP | 2001-300878 A | 10/2001 |
| JP | 2004-295223 A | 10/2004 |
| JP | 2009-128191 A | 6/2009 |
| JP | 2011-167815 A | 9/2011 |
| JP | 2012-125886 A | 7/2012 |
| JP | 2012-135820 A | 7/2012 |

\* cited by examiner

APPARATUS AND METHOD OF TAKING OUT BULK STORED ARTICLES BY ROBOT

RELATED APPLICATION DATA

This application claims priority under 35 U.S.C. §119 and/or §365 to Japanese Application No. 2012-165553 filed Jul. 26, 2012, the entire contents is incorporated herein by reference.

BACKGROUND OF THE INVENTION

1. Field of the Invention

The present invention relates to an article take-out apparatus and article take-out method, which recognize the positions of articles stored in bulk in a 3D space and take out the recognized articles by using a robot.

2. Description of the Related Art

As this type of apparatus, in the past, there is a known apparatus, which is designed to recognize the positions of articles stored in bulk by carrying out pattern matching on 2D images obtained by photographing the articles with a camera or on a 3D point set obtained by measurement with a 3D measuring device.

Japanese Unexamined Patent Publication No. 2004-295223A (JP2004-295223A) describes an apparatus which prepares a 2D model pattern from a 2D image which is obtained by photographing an article in a reference relative posture in advance, processes that 2D model pattern by 2D geometric conversion to prepare a plurality of converted 2D model patterns, and uses the plurality of converted 2D model patterns to carry out 2D pattern matching on a 2D image of an article.

Japanese Unexamined Patent Publication No. 2009-128191A (JP2009-128191A) describes an apparatus which measures the surfaces of articles in a 3D space to acquire a 3D point set, determines 3D features of the articles based on this 3D point set, and carries out 3D pattern matching between the 3D features of the articles and a 3D model pattern prepared in advance.

However, the apparatuses which are described in JP2004-295223A and JP2009-128191A require the preparation of a 2D model pattern or 3D model pattern in advance for each type of article, so troublesome work is required. In particular, when there are a large number of types of articles, it is necessary to prepare that number's worth of model patterns, so tremendous work is required. Further, in the case of irregularly shaped articles, since it is inherently not possible to create model patterns, application is impossible.

SUMMARY OF THE INVENTION

One aspect of the present invention is an article take-out apparatus comprising a robot having a hand capable of holding an article; a 3D measuring device measuring surface positions of a plurality of articles stored in bulk in a 3D space to acquire a 3D point set composed of a plurality of 3D points; a local maximum point selecting unit selecting from the 3D point set a 3D point, where a coordinate value with respect to a predetermined coordinate axis is maximum, as a local maximum point; a processing unit determining a hand position and posture including a target position and target posture of the hand enabling an article near the local maximum point to be taken out, based on the local maximum point selected by the local maximum point selecting unit; and a robot control unit controlling the robot so as to move the hand to the hand position and posture determined by the processing unit and take out the article from the hand position and posture.

Further, another aspect of the present invention is an article take-out method for taking out articles stored in bulk in a 3D space by using a robot with a hand capable of holding an article, comprising measuring surface positions of a plurality of articles stored in bulk by a 3D measuring device to acquire a 3D point set composed of a plurality of 3D points; selecting from the 3D point set a 3D point, where a coordinate value with respect to a predetermined coordinate axis is maximum, as a local maximum point; determining a hand position and posture including a target position and target posture of the hand enabling an article near the local maximum point to be taken out based on the selected local maximum point; and controlling the robot so as to move the hand to the determined hand position and posture and take out the article from the hand position and posture.

BRIEF DESCRIPTION OF THE DRAWINGS

The object, features, and advantages of the present invention will become clearer from the following explanation of embodiments given with reference to the attached drawings, in which.

DETAILED DESCRIPTION

Figure 1:
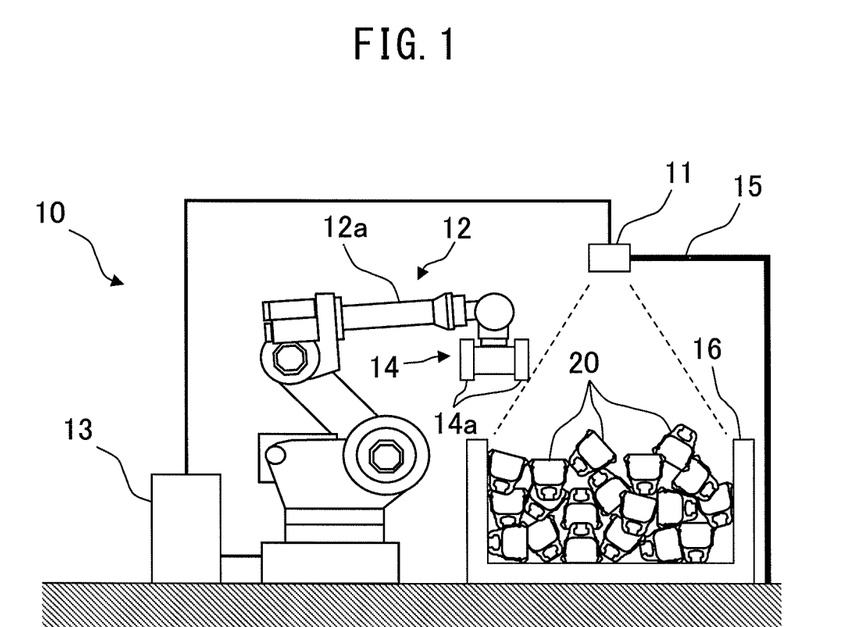
FIG. 1 is a view which shows the schematic configuration of an article take-out apparatus according to one embodiment of the present invention.

FIG. 1 is a view which shows the schematic configuration of an article take-out apparatus 10 according to one embodiment of the present invention. The article take-out apparatus 10 includes a 3D measuring device 11, a robot 12, and a robot control device 13 which connects the 3D measuring device 11 and the robot 12 and controls the robot 12. The robot 12 has a hand 14 which is attached to a front end of an arm 12a.

Inside a container 16 with an open top, a plurality of articles 20 are stored in bulk. The article take-out apparatus 10 of the present embodiment recognizes the positions of the articles 20 to be taken out from the state of bulk storage of this plurality of articles 20, takes out and holds a recognized article 20 from inside of the container 16 by the hand 14, and conveys it to a predetermined position outside of the container 16 by operation of the robot 12. Although the plurality of articles 20 are illustrated in FIG. 1 as being the same shape as each other, they may also include irregularly shaped articles or a plurality of types of articles. Hereinafter, an article 20 which is held by the hand 14 will sometimes be referred to as a "held article 21" to differentiate it from the other articles in the container 16 (see FIG. 11).

The hand 14 has a pair of holders 14a which can be raised and lowered by a not shown elevation mechanism. The holders 14a are usually in the raised state such as shown in FIG. 1. They lower from this raised state to pick up articles 20, then are again raised so as to rise the held articles 21 in the vertical direction. Due to this, the held articles 21 are taken out upward from the other articles 20. When the robot 12 is operated to convey the held articles 21, collision of the held articles 21 or the hand 14 with other articles 20 inside of the container 16 can be avoided.

The 3D measuring device 11 is arranged above the center part of the container 16. It measures the surfaces of exposed articles 20 from the articles 20 stored in bulk inside the container 16 so as to acquire a plurality of 3D points of position information (3D information). The measurement range of the 3D measuring device 11 has to include the container 16. However, if too large, a drop in the measurement resolution will be invited. Therefore, the range is preferably made exactly the extent including the area occupied by the container 16. Although the 3D measuring device 11 is fastened to a dedicated frame 15 in the illustrated example, it may also be attached to the front end of the robot 12. The 3D measuring device 11 and the robot control device 13 are linked together by a communication cable or other communication means and can communicate with each other.

As the 3D measuring device 11, one of various non-contact systems may be utilized. For example, a stereo system using two cameras, a laser slit scanning system, a laser spot scanning system, a system using a projector or other device to project a pattern of light on an article, a system utilizing the travel time of light from being emitted from a laser emitter to being reflected at the surface of an article and entering a light receiver, etc. may be mentioned.

The 3D measuring device 11 expresses the acquired 3D information in the form of a distance image or 3D map. A "distance image" expresses 3D information in an image format. It uses the brightness or color of the pixels of the image to express the height of a position on the image or distance from the 3D measuring device 11. On the other hand, a "3D map" expresses 3D information as a set of measured 3D coordinate values (x,y,z). In the present embodiment, a pixel in a distance image or a point having 3D coordinate values in a 3D map will be referred to as a "3D point", while a set of a plurality of 3D points will be referred to as a "3D point set". A 3D point set is the set of the entire 3D points which are measured by the 3D measuring device 11 and can be acquired by the 3D measuring device 11.

The hand 14 can take out and hold an article 20. As the type of hand which can do this, for example, a suction nozzle, pickup magnet, suction pad, etc. may be mentioned. Further, the hand 14 is controlled in its position and posture by operation of the robot 12.

Figure 2:
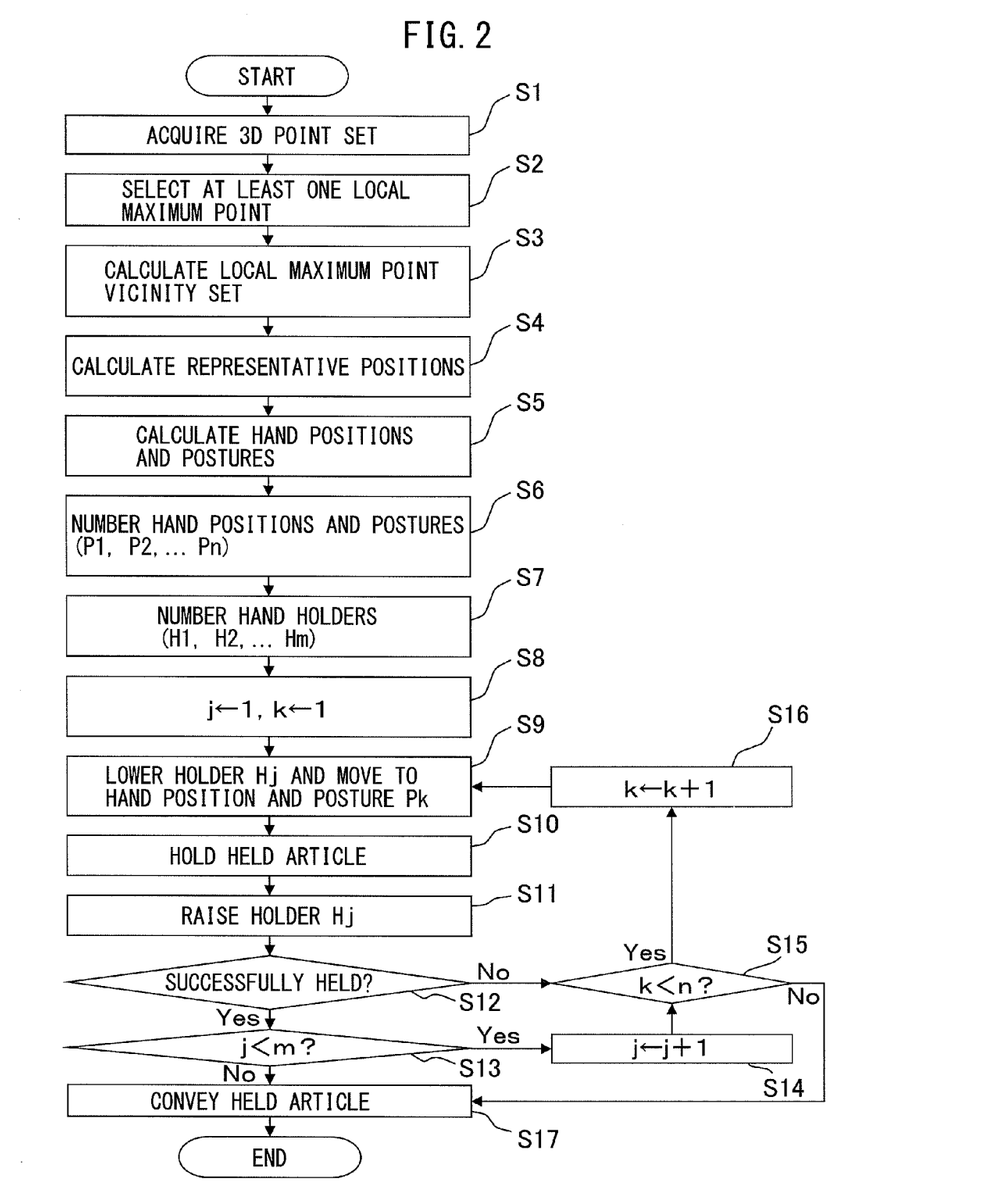
FIG. 2 is a flow chart which shows one example of processing which is carried out by the robot control device of FIG. 1.

FIG. 2 is a flow chart which shows one example of processing which is carried out by the robot control device 13. Below, the operation by the article take-out apparatus 10 will be explained with reference to the flow chart of FIG. 2 and the related drawings.

Figure 3:
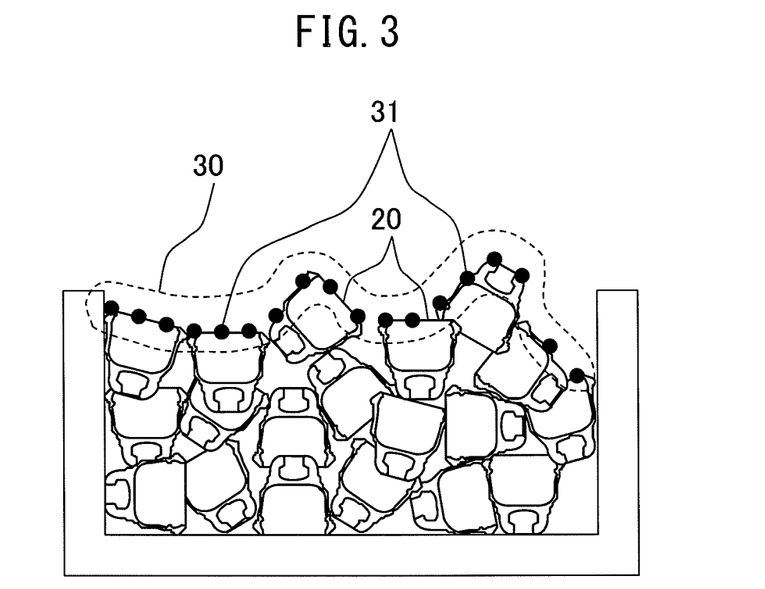
FIG. 3 is a view which shows an example of a 3D point set acquired by the 3D measuring device of FIG. 1.

The processing of FIG. 2 is, for example, started by operation of a not shown operation switch for inputting a take-out start command of an article 20. First, the surfaces of the plurality of articles 20 which are stored in bulk in the 3D space are measured by the 3D measuring device 11 to acquire the 3D point set 30 (step S1). FIG. 3 is a view which shows one example of the 3D point set 30 acquired by the 3D measuring device 11 and the 3D points 31 composing the 3D point set 30. In the figure, the 3D points 31 are shown by black dots, while the 3D point set 30 is shown as a whole of the black dots surrounded by a broken line.

Figure 4:
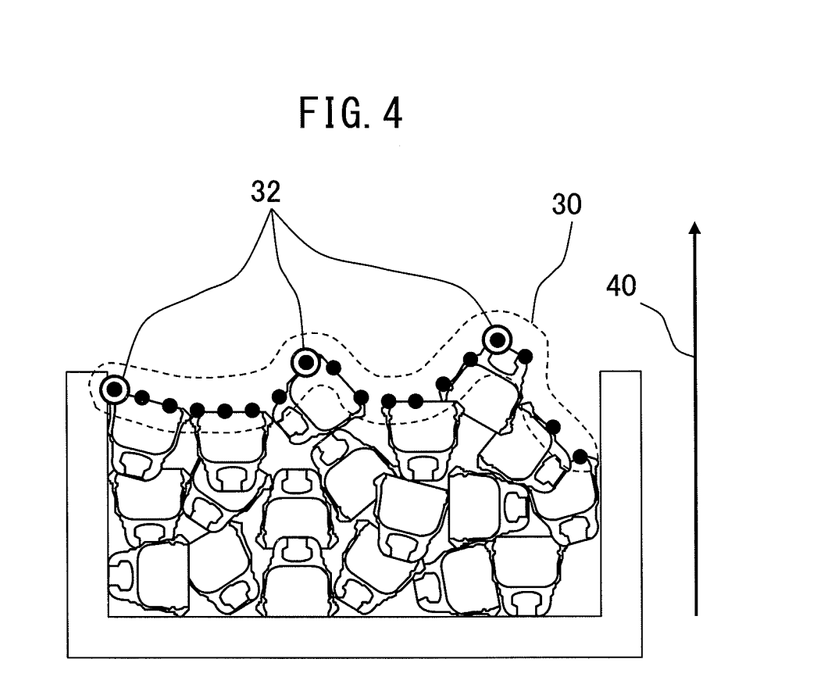
FIG. 4 is a view which shows an example of local maximum points selected from the 3D point set of FIG. 3.

Next, one or more local maximum points 32 are selected from the 3D point set 30 (step S2). FIG. 4 is a view which shows an example of a 3D point set 30 and local maximum points 32 selected from the 3D point set 30. In the figure, the local maximum points 32 are shown by circled black dots. The local maximum points 32 are the points, among the 3D points 31 which belong to the 3D point set 30, where the coordinate values for a predetermined coordinate axis 40 become local maximums. In the present embodiment, corresponding to the direction of taking out the articles 20, the coordinate axis 40 is, for example, set to the vertical upward orientation (Z-axis direction), that is, an orientation against gravity.

Figure 5:
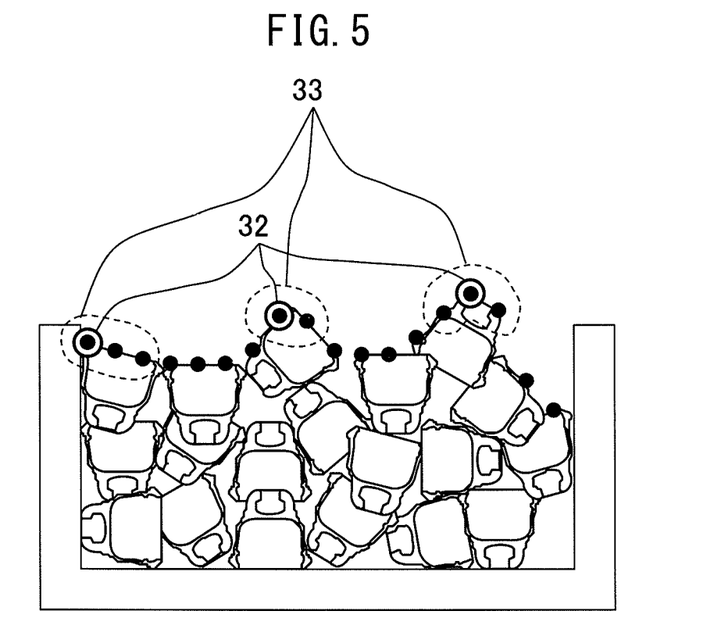
FIG. 5 is a view which shows an example of local maximum point vicinity sets determined corresponding to the local maximum points of FIG. 4.

Next, local maximum point vicinity sets 33 corresponding to the respective local maximum points 32 are determined (step S3). FIG. 5 is a view which shows one example of the local maximum point vicinity sets 33 determined corresponding to the respective local maximum points 32. The local maximum point vicinity sets 33 are shown by broken lines. The local maximum point vicinity sets 33 are sub sets of the 3D point set 30 of FIG. 3, which are sets corresponding to the respective local maximum points 32 and include the local maximum points 32.

There are several methods for determining the local maximum point vicinity sets 33. First, as a first example, there is the method of composing the respective local maximum point vicinity sets 33 from only the corresponding local maximum points 32. As a second example, there is the method of composing the respective local maximum point vicinity sets 33 from all of the 3D points 31 within a predetermined distance from the corresponding local maximum points 32. As a third example, there is the method of composing the local maximum point vicinity sets 33 by connected sets including the local maximum points 32.

The "connected set" referred to here, if giving the mathematical definition, is a set of 3D points 31 wherein when the set is comprised of a plurality of 3D points 31, within a predetermined distance from any 3D point 31 belonging to that set, there is another 3D point 31 belonging to that set but different from that 3D point 31. Further, when it is comprised of only one 3D point 31 (there is no other 3D point 31 within the predetermined distance), that 3D point 31 alone composes the connected set.

Figure 16:
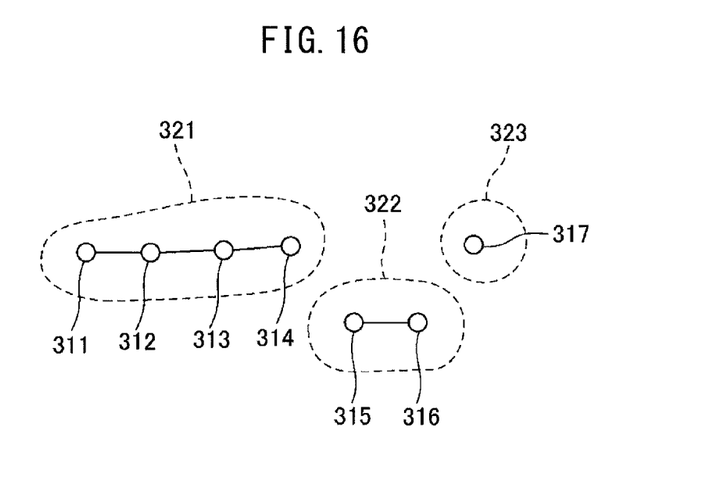
FIG. 16 is a view which shows specific examples of a connected set.

A connected set will be explained in further detail. FIG. 16 is a view which shows specific examples of a connected set. In FIG. 16, the 3D points 311 to 314 compose a connected set 321, the 3D points 315 and 316 compose a connected set 322, and the 3D point 317 composes a connected set 323. That is, the 3D points 311 and 312, 312 and 313, 313 and 314, and 315 and 316 are respectively within the predetermined distance and are connected with each other. On the other hand, the 3D point 317 has no other 3D point 31 present within the predetermined distance, so the 3D point 317 alone composes the connected set 323. An example of the processing for actually constructing connected sets will be given later.

As a fourth example, there is the method of composing the local maximum point vicinity set 33 by using the 3D points 31 including a local maximum point 32 to form a plane and using the 3D points 31 which compose this plane. Specifically, a plane is formed from the local maximum point 32 and the 3D points 31 positioned near the local maximum point 32. In this case, only the 3D points 31 positioned within a predetermined distance from the plane, among the 3D points positioned near the local maximum point 32, compose the local maximum point vicinity set 33.

As a fifth example, there is the method of composing the local maximum point vicinity set 33 by using a connected set of 3D points 31 including a local maximum point 32 to form a smooth curved surface and using the 3D points 31 which compose this curved surface. In this case, when for example, for each 3D point 31 belonging to a connected set, adding a separate three 3D points 31 selected in order closest from that 3D point 31 and using the four 3D points 31 to form a curved surface with a radius of curvature of a predetermined value or more, those four 3D points 31 are used to compose the local maximum point vicinity set 33. FIG. 5 shows the case of composing local maximum point vicinity sets 33 by the third example among the above five examples. That is, this shows the case where the local maximum point vicinity set 33 is composed of a connected set acquired by successively connected these 3D points (311 to 314 or 315 and 316) when there are a plurality of 3D points 31 which are positioned within a predetermined distance from each other, and a connected set composed of only the 3D point (317) when there is no other 3D point which is positioned within a predetermined distance.

Figure 6:
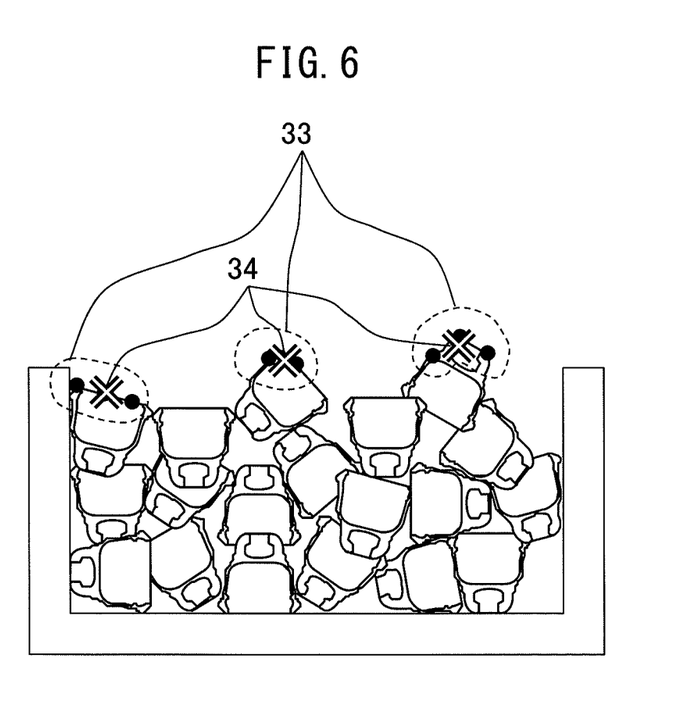
FIG. 6 is a view which shows an example of representative positions based on positions of 3D points belonging to the local maximum point vicinity sets of FIG. 5.

Next, representative positions 34 which correspond to the respective local maximum point vicinity sets 33 are calculated (step S4). FIG. 6 is a view which shows an example of representative positions 34 calculated based on the positions of the 3D points 31 which belong to the local maximum point vicinity sets 33. In the figure, the representative positions 34 are shown by the "x" marks. In FIG. 6, the average positions (average coordinates) of the pluralities of 3D points 31 which belong to the local maximum point vicinity sets 33 are determined as the representative positions 34. The method of determining the representative positions is not limited to this. For example, it is also possible to use the positions of the local maximum points 32 which correspond to the respective local maximum point vicinity sets 33 as the representative positions 34.

Figure 7:
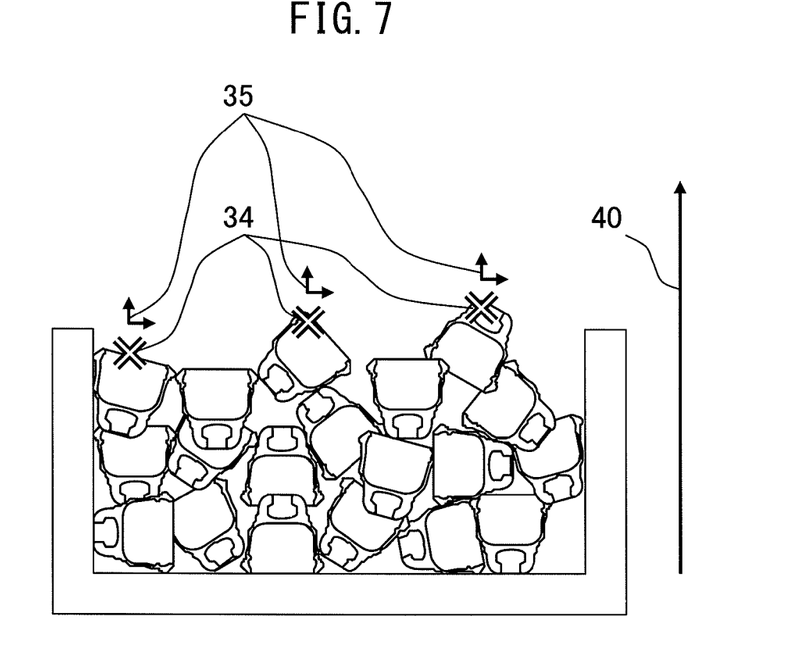
FIG. 7 is a view which shows an example of hand positions and postures corresponding to the representative positions of FIG. 6.

Next, the hand positions and postures 35 which correspond to the respective representative positions 34 are calculated (step S5). FIG. 7 is a view which shows an example of the hand positions and postures 35 which correspond to the representative positions 34. The hand positions and postures 35 are shown by the double-headed arrows bent at right angles. This is because the positions and postures are expressed by coordinate systems. In FIG. 7, since only two arrows are shown, it may appear as if the positions and postures are those in a 2D space. However, in fact they are in a 3D space.

There are several methods for determining the position components and the posture components of the hand positions and postures 35. For the position components, for example, there is the method of using the representative positions 34 as the position components of the hand positions and postures 35. As another example, there is the method of using positions moved by a predetermined length from the positions of the representative positions 34 along the direction of a predetermined coordinate axis 40 as the position components of the hand positions and postures 35. FIG. 7 shows the position components in the latter example. For the posture components, for example, there is the method of using a predetermined posture as the posture components of the hand positions and postures 35 regardless of the representative positions 34. As another example, when the positions of the representative positions 34 are close to the walls of the container 16, there is the method of inclining the hand in a direction away from the walls for the purpose of avoiding collision between the walls and the hand as the posture components of the hand positions and postures 35. FIG. 7 shows the posture components in the former example.

Figure 8:
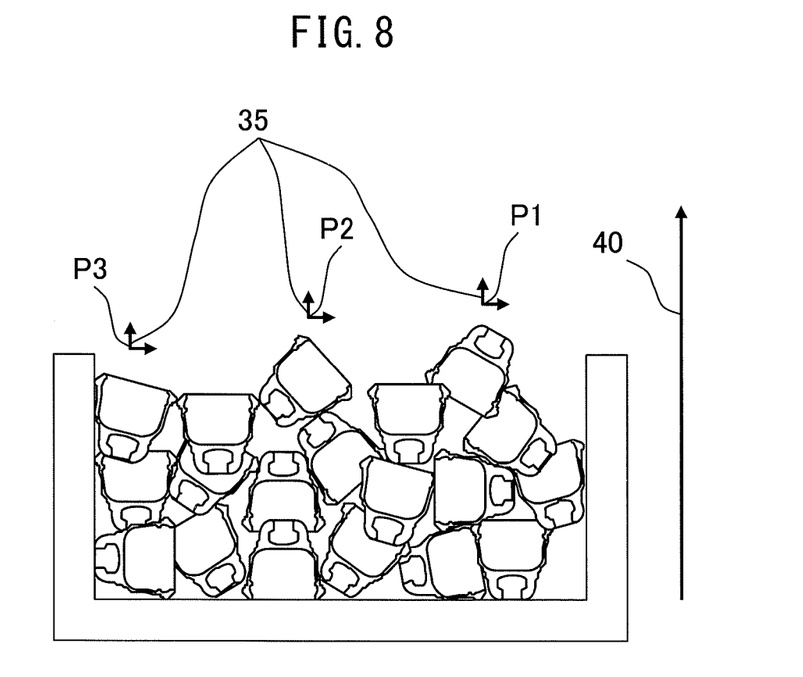
FIG. 8 is a view which shows an example of numbering of hand positions and postures of FIG. 7.

Next, the respective hand positions and postures 35 are numbered as P1, P2, . . . , Pn (step S6), where "n" is the number of the hand positions and postures 35. FIG. 8 is a view which shows the numbered hand positions and postures 35. These are numbered in descending order of coordinate values with respect to a predetermined coordinate axis 40, that is, in order from the ones at the highest position. In FIG. 8, n=3.

Figure 9:
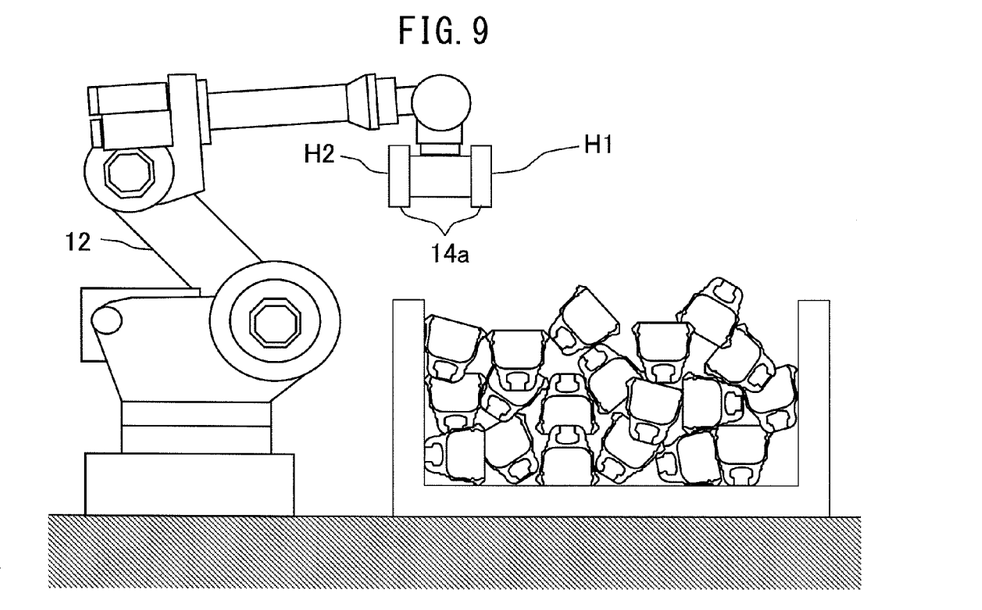
FIG. 9 is a view which shows an example of numbering of holders of hands configuring part of the article take-out apparatus of FIG. 1.

Next, the holders 14a of the hand 14 are numbered as H1, H2, . . . , Hm (step S7), where "m" is the number of the holders. FIG. 9 shows the numbered holders 14a. In FIG. 9, m=2.

Next, the variables "j" and "k" taking values of natural numbers are initialized. That is, 1 is entered for "j" (j←1) and 1 is entered for "k" (k←1) (step S8). The variable "j" is used for designating the number of the holder 14a, while the variable "k" is used for designating the number of the hand position and posture 35. Below, a holder 14a corresponding to the variables "j" is represented as "Hj", and a hand position and posture 35 corresponding to the variables "k" is represented as "Pk".

Figure 10:
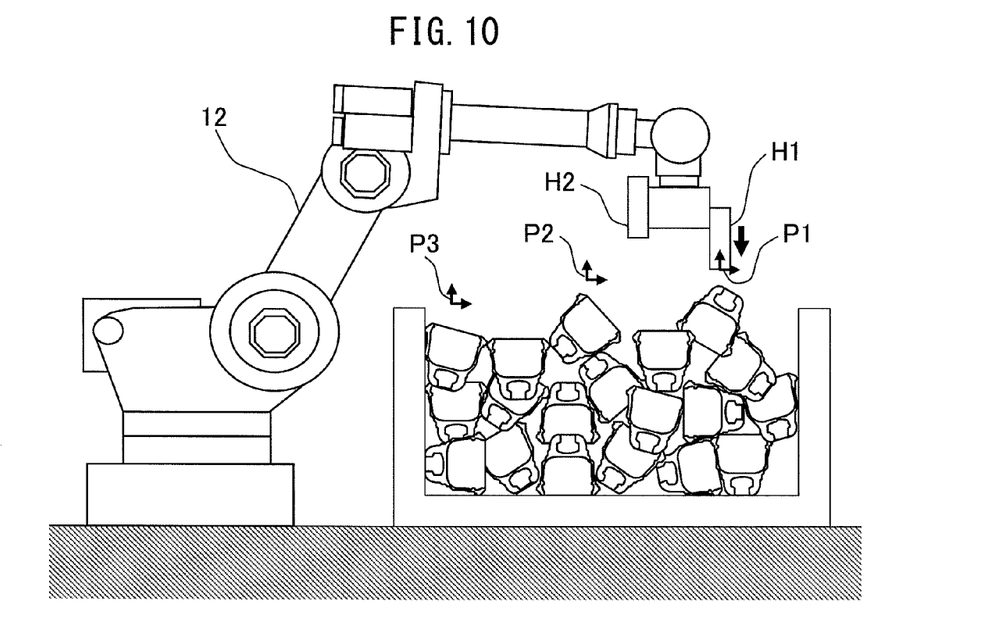
FIG. 10 is a view which shows an example of the operation of an article take-out apparatus according to an embodiment of the present invention.

Next, as shown in FIG. 10, a control signal is output to the actuator for driving the holder Hj to lower the holder Hj, while a control signal is output to the actuator for driving the robot to move the holder Hj to the hand position and posture Pk by operation of the robot 12 (step S9). For the initial values of the variables j=1 and k=1, Hj=H1 and Pk=P1.

Figure 11:
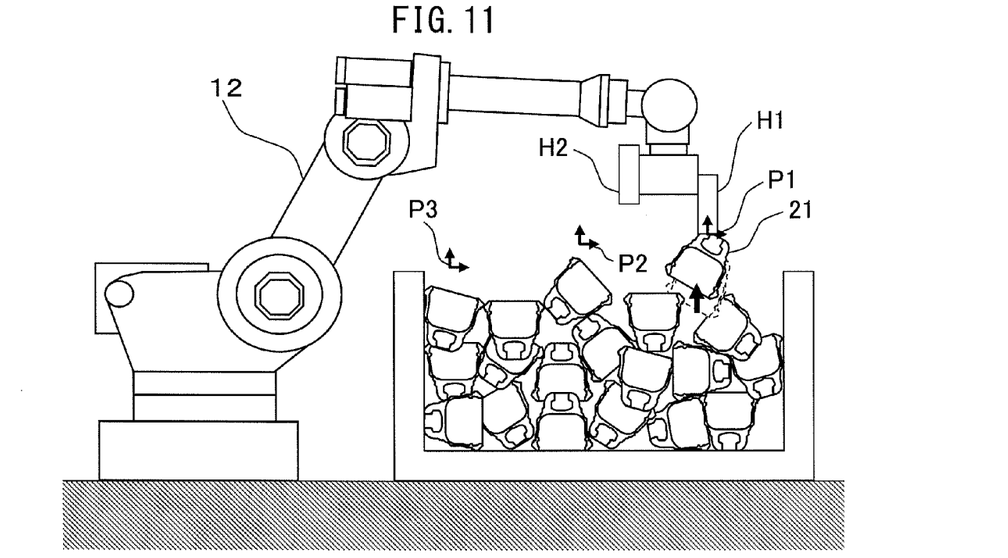
FIG. 11 is a view which shows an example of the operation after FIG. 10.

Next, a control signal is output to the holder Hj to suck up or pick up an article 20. Therefore, as shown in FIG. 11, the bottom end face of the holder Hj sucks up or picks up and holds the article 20 (the held article 21) (step S10). For example, when the holder Hj has a suction nozzle, a vacuum pump is actuated and the suction force is used to suck up and hold the held article 21. Further, when the holder Hj is a pickup magnet, current is run through an electromagnet coil to energize the magnet and the magnetic force is used to pick up and hold the held article 21.

Figure 12:
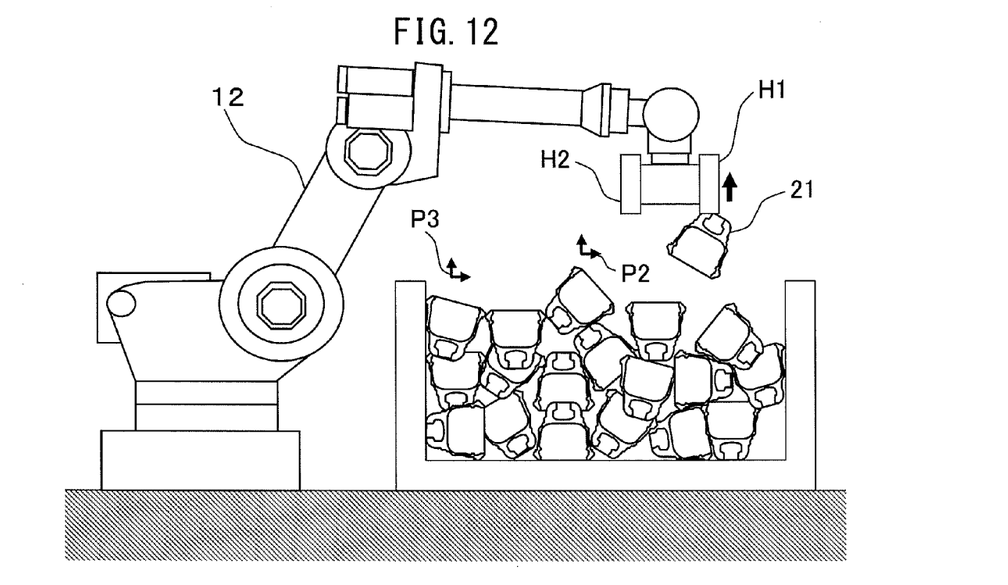
FIG. 12 is a view which shows an example of the operation after FIG. 11.

Next, as shown in FIG. 12, the holder Hj holding the held article 20 is made to rise (step S11). By making the holder Hj rise, when moving the hand 14 by operation of the robot 12, it is possible to avoid collision between the held article 21 or holder Hj and another article 20.

Next, it is judged if the holder Hj has succeeded in holding the held article 21 (step S12). For example, when the holder Hj has a suction nozzle, it is sufficient to use the change in the flow rate or pressure of the air at the time of suction so as to judge if the holding operation has been successful. Further, when the holder Hj is a pickup magnet, it is sufficient to judge by a proximity sensor if there is the held article 21 and use the existence of the held article 21 as the basis to judge if the holding operation has been successful. If the holding operation has been successful, the routine proceeds to step S13. If the holding operation has not been successful, the routine proceeds to step S15.

At step S13, it is judged if j<m is satisfied. This judgment is judgment as to whether there are holders Hj which still do not hold held articles 21 among the "m" number of holders 14a (in FIG. 12, two). When j<m is satisfied, the holder Hj+1 still does not hold a held article 21, so "j" is incremented by 1 to make j←j+1 (step S14) and the routine proceeds to step S15. When j<m is not satisfied, all holders Hj hold held articles 21, so the routine proceeds to step S17.

Figure 13:
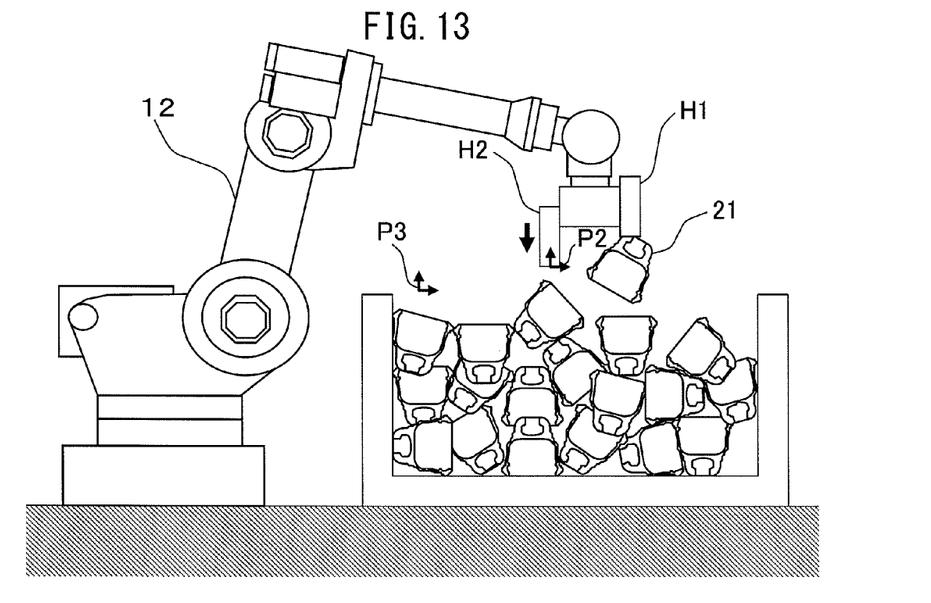
FIG. 13 is a view which shows an example of the operation after FIG. 12.
Figure 14:
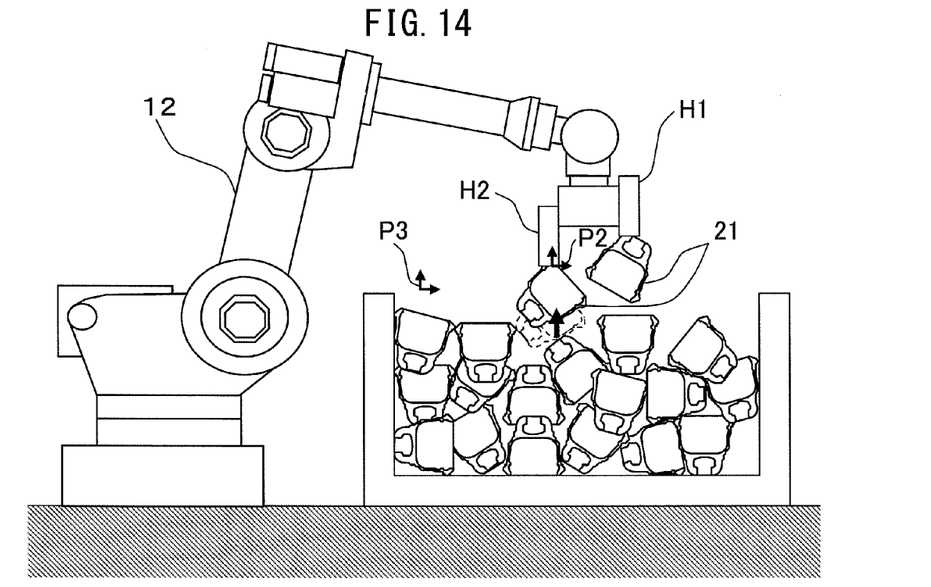
FIG. 14 is a view which shows an example of the operation after FIG. 13.

At step S15, it is judged if k<n is satisfied. This judgment is judgment as to whether there are hand positions and postures 35 which the holders Hj have still not reached among the "n" number of hand positions and postures 35 (in FIG. 12, three). When k<n is satisfied, the holder Hj has still not reached the hand position and posture Pk+1, so "k" is incremented by 1 to make k←k+1 (step S16) and the routine returns to step S9. Further, as shown in FIG. 13, the next holder Hj is made to move to the next hand position and posture Pk while being lowered by operation of the robot 12. FIG. 13 shows an example where Hj=H2 and Pk=P2. Next, a control signal is output to this holder Hj to pick up an article and, as shown in FIG. 14, the next held article 21 is held (step S10). When k<n is not satisfied, the holders Hj have reached all of the "n" number of hand positions and postures 35, so the routine proceeds to step S17.

At step S17, a control signal is output to the actuator used for the robot, the held article 21 is conveyed by operation of the robot 12 to a predetermined position, and the held article 21 is detached from the holder Hj. With the above, one cycle of processing is ended. Note that, when despite there being unreached hand positions and postures 35 (k<n), all of the holders Hj are holding held articles 21 (j≥m), at step S17, the held articles 21 are conveyed to the predetermined positions and detached from the holders Hj, then the number "j" of the holder Hj is set to the initial 1 and the processing after step S9 is repeated.

In the above cycle, to facilitate high speed movement when moving the hand 14 in the order of numbering of the hand positions and postures 35, as shown in FIG. 8, the hand positions and postures 35 are numbered so that the coordinate values with respect to a predetermined coordinate axis 40 become in descending order to thereby reduce the risk of collision of the hand 14 with the article 20 during movement of the hand 14. In addition, regarding the coordinate values with respect to a predetermined coordinate axis 40, it is also possible to calculate the average values of the 3D points 31 included at the respective local maximum point vicinity sets 33 and number the hand positions and postures 35 in the order of the greater difference between the average value and the hand position and posture 35 corresponding to the average value. Due to this, it is possible to reduce the risk of collision with a nearby article 20 just before the hand 14 reaches a hand position and posture 35.

As the third example of the method of determining the local maximum point vicinity sets 33, the method of using a connected set including a local maximum point 32 to configure the local maximum point vicinity set 33 is explained. Below, an example of the processing for constructing a connected set including a single local maximum point 32 will be explained using the flow chart of FIG. 15. First, as initial values, 1 is entered for the variable "i" taking the value of a natural number (i←1), the set A of 3D points is made A←{local maximum point 32}, and the set B of 3D points is made B←{local maximum point 32} (step T1). Next, the set of all 3D points "c" which are within a predetermined distance from the 3D points in the set B and not belonging to the set A is made the set B again (step T2). With respect to the initial value, all 3D points "c" which are within a predetermined distance from the local maximum point 32 and differ from the local maximum point 32 are collected. Next, it is judged whether "i" is less than a predetermined number (step T3). This judgment is judgment of whether the number "i" of repeated calculations has reached a predetermined number. When i<predetermined number is satisfied, the number of repeated calculations has not yet reached the predetermined number, so the routine proceeds to step T4. When i<predetermined number is not satisfied, the number of repeated calculations has already reached the predetermined number, so the routine proceeds to step T6.

Figure 15:
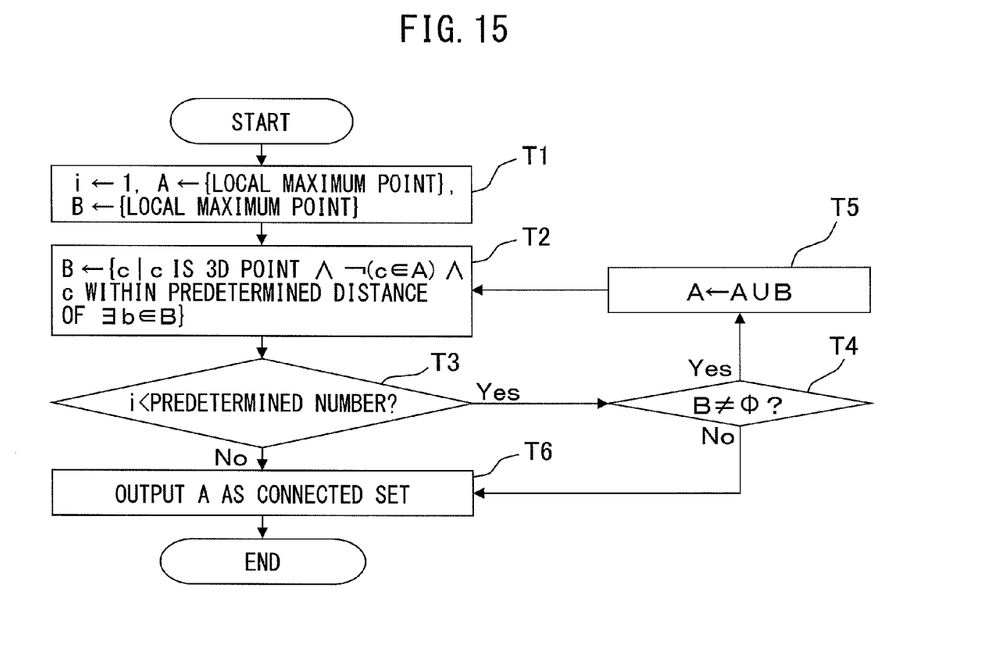
FIG. 15 is a flow chart which shows one example of processing for constructing a connected set.

At step T4, it is judged if B≠Φ is satisfied. This judgment is judgment of whether there is a 3D point which should be newly added to the set A. When B≠Φ is satisfied, the set B should be added to the set A, A←A∪B is set (step T5), and the routine returns to step T2. When B≠Φ is not satisfied, there is no 3D point which should be newly added to the set A, so the routine proceeds to step T6. At step T6, the set A is output as the connected set and processing for constructing the connected set is ended. The predetermined number which is used for judgment of the number "i" of repeated calculations is for cutting off the repeated calculations at a suitable number. If setting the predetermined number "i" small, only a small connected set can be constructed, but an increase in the processing time can be prevented. Conversely, if setting the predetermined number "i" large, the processing time increases, but a large connected set can be constructed.

According to the present embodiment, the following functions and effects can be exhibited:

(1) The present embodiment includes measuring surface positions of articles 20 stored in bulk in a 3D space by a 3D measuring device 11 to acquire a 3D point set 30 composed of a plurality of 3D points 31 (step S1), selecting from the 3D point set 30 at least one 3D point 31, where a coordinate value with respect to a predetermined coordinate axis 40 is maximum, as a local maximum point 32 (step S2), determining a hand position and posture 35 including a target position and target posture of a hand 14 (holder 14a) enabling an article 20 near the local maximum point 32 to be taken out based on the selected local maximum point 32 (step S3 to step S5), and controlling the robot 12 so as to move the hand 14 to the determined hand position and posture 35 and take out the article 21 from the hand position and posture 35 (step S9 to step S11).

For this reason, there is no need to prepare a model pattern of the article 20. Even with a large number of types of articles or irregularly shaped articles 20, it is possible to easily recognize their positions and hold the articles 20. Further, even with an added new type of articles 20, it is possible to recognize their positions without adding model patterns and possible to avoid failure of recognition or mis-recognition of the positions and postures of articles 20 or failure of take-out or collision of articles 20 and other problems. As a result, it is possible to move the hand 14 to easily accessible articles 20 at the top at a high speed and efficiently take out the articles 20.

As opposed to this, for example, with the method of using a 2D model pattern of an article 20 and using pattern matching to recognize the position of the article (method according to a first comparative example), it is necessary to prepare a 2D model pattern and therefore troublesome work is required. In particular, when there are a large number of types of articles, it is necessary to prepare that number's worth of model patterns and therefore tremendous work is required. Furthermore, in the method by the first comparative example, there is the following problem when compared with the present embodiment. Articles which are stored in bulk take various postures. If carrying out 2D pattern matching corresponding to the different postures, for example, it is necessary to utilize converted 2D model patterns obtained by application of 2D geometric conversion. However, this method can only be used for flat articles. If trying to apply 2D pattern matching to a usual 3D article, considering the numerous different ways of viewing it, which cannot be made up for by geometric conversion, it becomes necessary to prepare 2D model patterns from several directions such as the front, back, sides, and a slant even for just a single type of article. Furthermore, if considering how to deal with a large number of types of articles, it becomes necessary to prepare an enormous number of 2D model patterns resulting from multiplication of the number of types of articles and tremendous work is required. Further, in the case of irregularly shaped articles, 2D model patterns cannot be prepared, so their positions cannot be recognized. Bulk stored articles suffer from poor lighting, shadows from other articles, unforeseen slanting of the articles, and other poor photographing conditions. Therefore, there is a risk of failure of recognition or mis-recognition of the positions and postures of articles, failure to recognize the positions of key articles at the top, and premature recognition of the positions of articles at the bottom. If controlling the hand position and posture of the robot while aiming at a mis-recognized position and posture of an article or the position of an article at the bottom, the article will fail to be taken out and the work efficiency of the apparatus will fall. Not only that, the hand and article are liable to collide and damage themselves. If trying to avoid damage, it is necessary to slow the speed of movement of the robot and therefore the work efficiency deteriorates.

Further, for example, with the method of using a 3D model pattern of an article and using 3D pattern matching to recognize the position of the article (method according to a second comparative example) as well, a 3D model pattern has to be prepared and troublesome work is required. In particular, when there are a large number of types of articles, it is necessary to prepare that number's worth of model patterns and tremendous work is required. Furthermore, the method according to the second comparative example has the following problem when compared with the present embodiment. With irregularly shaped articles, 3D model patterns cannot be prepared, so the positions cannot be recognized. Bulk stored articles do not enable 3D points to be acquired at the sides not facing the 3D measuring device. In addition, they greatly slant or are blocked by nearby articles resulting in poor photographing conditions. For this reason, it is difficult to obtain a 3D point set sufficient in both quantity and quality to enable determination of the 3D posture of an article by 3D pattern matching. Therefore, there is a risk of failure of recognition or mis-recognition of the positions and postures of articles, failure to recognize the positions of key articles at the top, and premature recognition of the positions of articles at the bottom. If controlling the hand position and posture of the robot while aiming at a mis-recognized position and posture of an article or the position of an article at the bottom, the article will fail to be taken out and the work efficiency of the apparatus will fall. Not only that, the hand and article are liable to collide and damage themselves. If trying to avoid damage, it is necessary to slow the speed of movement of the robot and therefore the work efficiency deteriorates.

(2) When determining the hand position and posture 35, the present embodiment includes determining the local maximum point vicinity set 33 which is a sub set of the 3D point set 30 and comprised of a set of 3D points 31 including the selected local maximum point 32, determining the representative positions 34 which represent the local maximum point vicinity sets 33 based on the positions of the 3D points 31 included in the local maximum point vicinity set 33 as the basis to, and determining the hand positions and postures 35 corresponding to the representative positions 34. Due to this, it is possible to use the local maximum point 32 to set the hand position and posture 35 by various methods.

(3) The present embodiment includes providing a plurality of holders 14a at the hand 14, judging whether there is an empty holder 14a which does not hold an article 20 among the plurality of holders 14a (step S13) and, if it is judged there is an empty holder 14a, successively moving the empty holder 14a to a not yet reached hand position and posture which the holder 14a has not yet reached among the plurality of hand positions and postures 35 and taking out the article 21 from the not yet reached hand position and posture. Due to this, it is possible to efficiently utilize a plurality of holders 14a and possible to efficiently perform the work of taking out articles 20.

(4) When an article 20 has end parts which easily form local maximum points and the surfaces or sides which are connected to the end parts are easier to hold than the end parts themselves, it is possible to utilize positions of the connected sets, that is, the local maximum point vicinity sets 33, instead of the positions of the local maximum points 32 so as to hold the more easily holdable surfaces or sides.

So long as measuring surface positions of a plurality of articles 20 stored in bulk by a 3D measuring device 11 to acquire a 3D point set 30 composed of a plurality of 3D points 31, selecting from the 3D point set 30 at least one 3D point 31, where a coordinate value with respect to a predetermined coordinate axis 40 is maximum, as a local maximum point 32, determining a hand position and posture 35 including a target position and target posture of the hand 14 (holder 14a) enabling an article 20 near the local maximum point 32 to be taken out based on the selected local maximum point 32, and controlling the robot 12 so as to move the hand 14 to the determined hand position and posture 35 and take out the article 20 (held article 21) from the hand position and posture 35, the article take-out method may be configured in any way.

Figure 17:
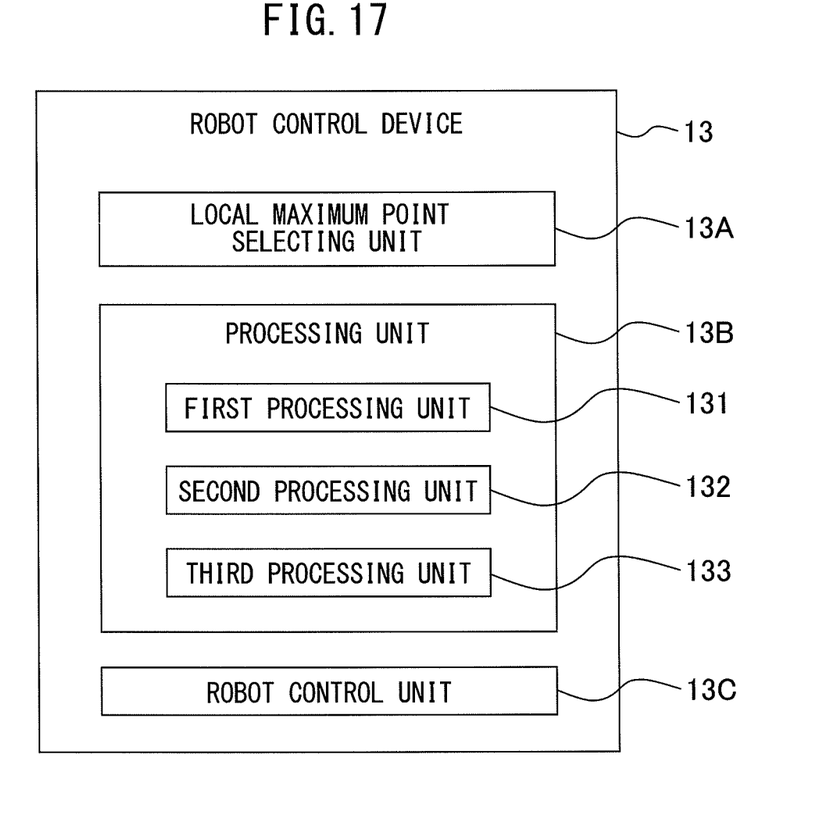
FIG. 17 is a block diagram which shows a configuration inside the robot control device of FIG. 1.

In the above embodiment, although the hand 14 is used to suck up or pick up and hold an article, means other than suction and magnetic pickup may also be used to take out and hold an article 20. Therefore, the type of the hand 14 is not limited to the one explained above. Three or more holders 14a may be provided at the hand 14 or just one may also be provided. FIG. 17 is a block diagram which shows a configuration inside the robot control device 13 of FIG. 1. The robot control device 13 includes a local maximum point selecting unit 13A, a processing unit 13B and a robot control unit 13C. The processing unit 13B includes a first processing unit 131, a second processing unit 132 and a third processing unit 133. The configuration of the above-mentioned article take-out apparatus 10 (FIG. 1) is just one example. The local maximum point selecting unit 13A (step S2), processing unit 13B, that is, the first processing unit 131 (step S3), second processing unit 132 (step S4), and third processing unit 133 (step S5), and the robot control device 13 as the robot control unit 13C (step S9 to step S11) are not limited in configuration to the ones explained above.

The above embodiments may be freely combined with one or more of the modifications.

According to the present invention, when recognizing the positions of articles stored in bulk in a 3D space, rather than utilize recognition of positions and postures by pattern matching, the positions of local maximum points of the 3D point set are utilized so as to hold articles near the local maximum points by the robot hand. For this reason, there is no need to prepare model patterns of articles. Even with a large number of types of articles or with irregularly shaped articles, it is possible to recognize their positions and hold the articles.

While the present invention has been described with reference to the preferred embodiments thereof, a person skilled in the art would understand that various corrections and modifications may be made thereto without departing from the scope of disclosure of the later explained clams.

The invention claimed is:

1. An article take-out apparatus comprising:
   a robot having a hand capable of holding an article;
   a 3D measuring device measuring surface positions of a plurality of articles stored in bulk in a 3D space to acquire a 3D point set composed of a plurality of 3D points;
   a local maximum point selecting unit selecting from the 3D point set a 3D point, where a coordinate value with respect to a predetermined coordinate axis is maximum, as a local maximum point;
   a processing unit determining a hand position and posture including a target position and target posture of the hand enabling an article near the local maximum point to be taken out, based on the local maximum point selected by the local maximum point selecting unit; and
   a robot control unit controlling the robot so as to move the hand to the hand position and posture determined by the processing unit and take out the article from the hand position and posture,
   wherein the processing unit comprises,
      a first processing unit determining a local maximum point vicinity set which is a sub set of the 3D point set, the local maximum point vicinity set including a set of 3D points including the local maximum point selected by the local maximum point selecting unit,
      a second processing unit determining a representative position which represents the local maximum point vicinity set, based on positions of the 3D points included in the local maximum point vicinity set determined by the first processing unit, and
      a third processing unit determining the hand position and posture corresponding to the representative position determined by the second processing unit.

2. The article take-out apparatus according to claim 1, wherein
   the hand has a plurality of holders capable of respectively holding articles,
   the processing unit determines a plurality of the hand positions and postures,
   the robot control unit judges whether there is an empty holder which does not hold an article among the plurality of holders and, if it is judged there is the empty holder, controls the robot so as to successively move the empty holder to a not yet reached hand position and posture which the holder has not yet reached among the plurality of hand positions and postures and take out the article from the not yet reached hand position and posture.

3. The article take-out apparatus according to claim 1, wherein
   the robot control unit controls the robot so as to take out the article by the hand and convey the taken out article by the robot.

4. The article take-out apparatus according to claim 1, wherein
   the local maximum point vicinity set is comprised of a connected set acquired by successively connecting a plurality of the 3D points positioned within a predetermined distance from each other.

5. The article take-out apparatus according to claim 1, wherein
   the hand has either a suction nozzle, pickup magnet, or suction pad.

6. An article take-out method for taking out articles stored in bulk in a 3D space by using a robot with a hand capable of holding an article, comprising:
   measuring surface positions of a plurality of articles stored in bulk by a 3D measuring device to acquire a 3D point set composed of a plurality of 3D points;
   selecting from the 3D point set a 3D point, where a coordinate value with respect to a predetermined coordinate axis is maximum, as a local maximum point;
   determining a hand position and posture including a target position and target posture of the hand enabling an article near the local maximum point to be taken out based on the selected local maximum point; and
   controlling the robot so as to move the hand to the determined hand position and posture and take out the article from the hand position and posture,
   wherein the step of determining the hand position further comprises,
      determining a local maximum point vicinity set which is a sub set of the 3D point set, the local maximum point vicinity set including a set of 3D points including the local maximum point selected by the step of selecting,
      determining a representative position which represents the local maximum point vicinity set, based on positions of the 3D points included in the local maximum point vicinity set determined by the step of determining the local maximum point vicinity set, and
      determining the hand position and posture corresponding to the representative position determined by the step of determining the representative position.

* * * * *